APPARATUS FOR INDICATING AN ELECTRICALLY GROUNDED CONDITION

Original Filed July 16, 1959 2 Sheets-Sheet 1

APPARATUS FOR INDICATING AN ELECTRICALLY GROUNDED CONDITION

Original Filed July 16, 1959 2 Sheets-Sheet 2

United States Patent Office

Re. 25,957
Reissued Feb. 22, 1966

25,957

APPARATUS FOR INDICATING AN ELECTRICALLY GROUNDED CONDITION

Ellsworth E. Caldwell, Houston, Tex., assignor to Texaco Inc., New York, N.Y., a corporation of Delaware Original No. 3,040,211, dated June 19, 1962, Ser. No. 827,556, July 16, 1959. Application for reissue June 1, 1964, Ser. No. 382,980
11 Claims. (Cl. 317—2)

Matter enclosed in heavy brackets [ ] appears in the original patent but forms no part of this reissue specification; matter printed in italics indicates the additions made by reissue.

This invention relates generally to indicating means and specifically to a means for indicating the grounding of an electrostatically charged member, as, for example, a tank truck which transports volatile petroleum products.

Many tests indicate that the majority of tank truck transports entering a petroleum products loading rack carry a substantial electrostatic charge which, if not dissipated before the loading procedure begins, may cause a fire or explosion, should there be a static discharge during the loading of the products. This discharge may occur between the loading spout and the opening of the tank compartment, or between the rack structure or an individual contacting the truck transport, to result in the ignition of vapors within the truck transport or those vapors flowing to the ground.

A static charge can be accumulated also by the flow of petroleum products into the tank truck transport compartment during the loading period. If such a charge is not drained off continuously through an electrical grounding arrangement, it may build up to a point where it will discharge to ground and result in an explosion and/or fire.

Accordingly, it is an object of the present invention to provide an improved means for dissipating the electrical charge which may exist on a truck transport at the time it enters the loading rack or which may develop during its loading operation.

Another object of the invention is to provide an improved electrical grounding arrangement which is dependable and indicates that the electrical circuit to ground is not interrupted.

Still another object of the invention is to provide an effective electrical grounding circuit with means for indicating when such a circuit is broken.

And another object of the invention is to provide an electrical ground indicating apparatus which is simple to construct and economical to operate.

These and other objects, advantages and features of the invention will become apparent from a consideration of the specification in the light of the figures of the accompanying drawings wherein.

The objects of my invention are achieved by the use of relay control means which, in response to the completion of an electrical circuit to ground, actuates a circuit to indicate the electrically grounded condition.

Figure 1:
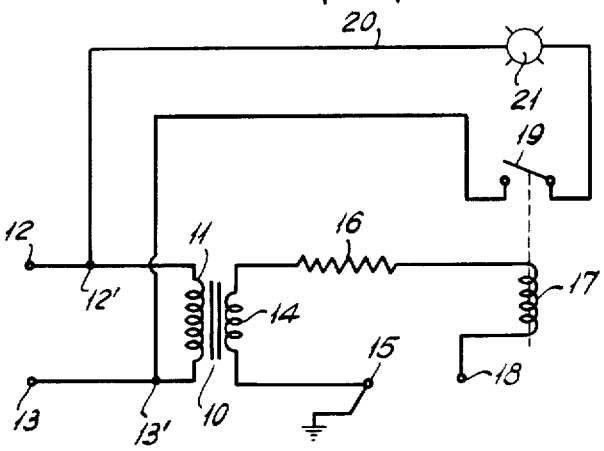
FIG. 1 is a simplified showing of the basic circuit of my electrical ground indicator.

Referring to FIG. 1, there is disclosed the basic circuit of my electrical ground indicator, including a transformer at 10, with its primary winding at 11 furnished with power by connection at the terminals 12 and 13, such power being obtained from a source of 120 volt, 60 cycle alternating current. The secondary winding 14 of the transformer 10 steps down the 120 v. A.C. supply to a nominal voltage of approximately 5 volts, with one terminal of the secondary winding grounded at the terminal 15, while the other terminal is connected in series with a resistor 16, a relay coil 17, and a terminal at 18. A grounding clamp, not shown, adapted to be attached to the member or object to be electrically discharged to ground, is connected across the terminals 15 and 18. In response to the flow of current when the ground circuit is completed by attachment of the clamp to the member to be electrically discharged and across the terminals 15 and 18, the relay coil 17 actuates the relay switch 19 in the indicating circuit, shown generally at 20, which has a lamp 21 in series therein and is connected across the source of power for the transformer, at 12' and 13'. It is possible to replace the lamp by other indicating means, as, for example, audible means such as a buzzer or a bell, or an electrical set up for closing down the operation of the loading pump.

Figure 2:
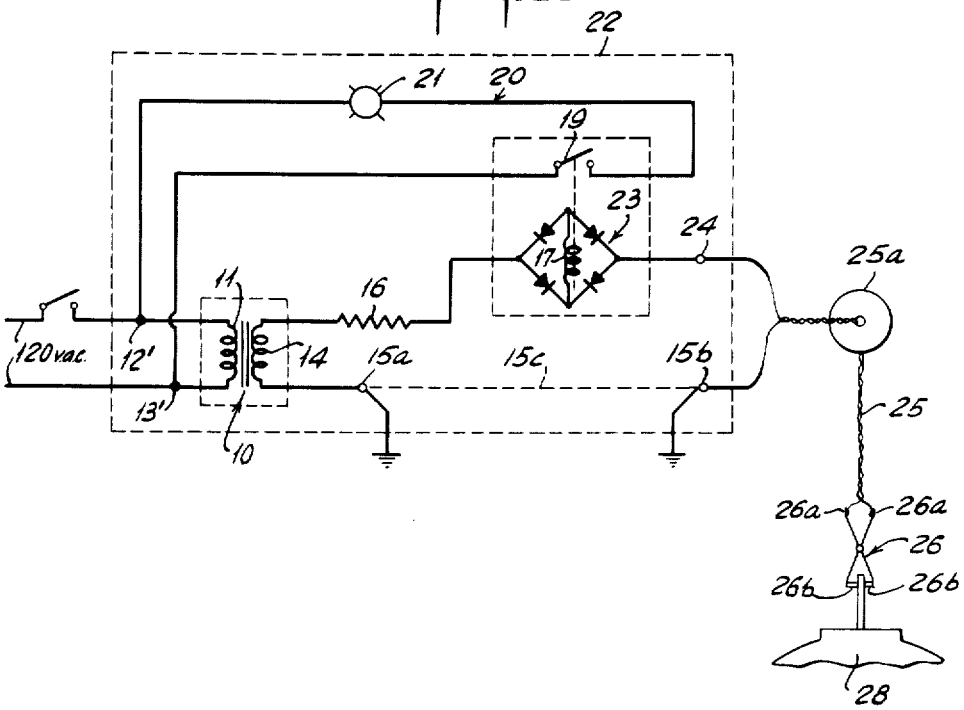
FIG. 2 is a showing of a refinement in the circuit of the ground indicator disclosed in FIG. 1.

There is disclosed in FIG. 2, a refinement of the basic electrical ground and the indicating circuit of FIG. 1, to include an explosion proof container 22, and with the same enumeration for the same or similar elements disclosed in FIG. 1. These include a hermetically sealed transformer at 10, indicated by the dotted outline, with the same 120 v. A.C. power supply to the primary winding 11 and across which the indicating circuit 20 is shown connected at 12' and 13'. The secondary winding 14 of the transformer 10 is connected at one of its terminals to ground, as at 15a, while the other terminal is connected in series to a resistor 16, a rectifier 23, and a contact at 24. The series circuit is continued therefrom through one of a pair of conductors at 25 which are joined to the individual ends of a spring or battery type clamp at 26. The jaws of the clamp are insulated from each other and in addition to their conductor terminals at 26a, 26a include the point contacts at 26b, 26b. The free end of the other of the pair of conductors is connected to the ground at 15b. The relay coil 17 is connected to the output of the rectifier 23 and actuates the relay switch at 19 to complete the indicating circuit 20 with the lamp at 21. In conjunction with the conductors 25, there is disclosed a take up reel 25a on which the excess of the pair of conductors may be stored. The combination of the rectifier, relay coil and switch may be positioned in a sealed container, shown in dotted outline.

In operation, the electrical ground circuit is completed by the application of the spring clamp 26 to the member to be grounded, e.g. the contacts at 26b are positioned to engage a part of a tank truck 28. When the contact engagement is made, a minute amount of current (of about .0015 ampere) flows from one jaw of the clamp through the portion of the truck or other member to be grounded and out of the other jaw of the clamp through one of the pair of conductors to the ground connection at 15b. The small amount of current flow causes the relay to operate, closing the switch at 19, completing a circuit and so energizing the indicating means to show that an electrical ground has been established. With the low voltage of approximately 5 volts and the small amount of current drawn by the relay, it is virtually impossible to obtain a spark when making or breaking the contact with the truck. As mentioned for FIG. 1, the relay coil may be utilized in a control scheme to interlock the operation of a solenoid valve to prevent the loading operation from taking place unless the truck has been grounded electrically.

As disclosed in FIG. 2, there are separate ground contacts at 15a and 15b, respectively for one end of the secondary winding of the transformer and for one of the pair of conductors in order to assure the complete electrical grounding of the charged member, even though it may be possible to interconnect the ground connections as indicated by the dotted line at 15c.

Figure 3:
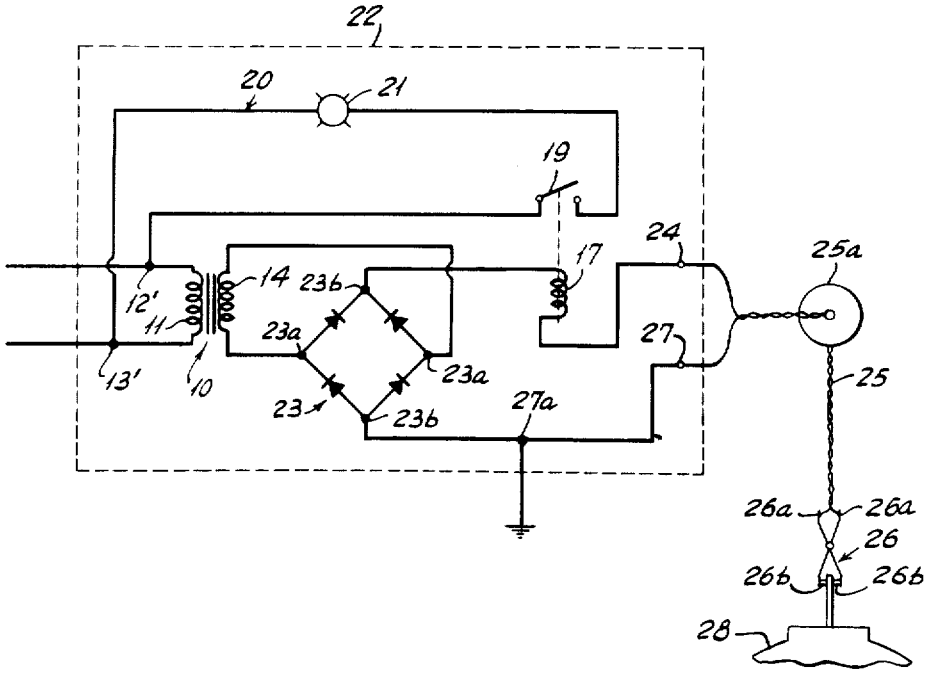
FIG. 3 is an alternative of the modification disclosed in FIG. 2.

FIG. 3 is a modification of the device disclosed in FIG. 2, with the same enumeration for the same or similar elements disclosed in FIGS. 1 and 2. The principal difference over the disclosure in FIG. 2 resides in the connection of the rectifier 23 at 23a, 23a across the output of the secondary winding 14 of the transformer 10, with the output of the rectifier at 23b, 23b connected in series with the relay coil 17, the double conductors 25 and clamp 26 through the terminals at 24 and 27 to the ground terminal at 27a. The relay coil 17 is actuated by the flow of current when the clamp is applied to the charged member, 28, the relay switch at 19 is closed and the indicating circuit at 20 is completed so that the light at 21 is lit. The difference between the circuits disclosed in FIGS. 2 and 3 is that in the latter, the rectifier is energized whether or not an electrical ground contact has been made, while in FIG. 2, the rectifier is energized only when the clamp has been applied to the charged member and there is a flow of current to ground.

Figure 4:
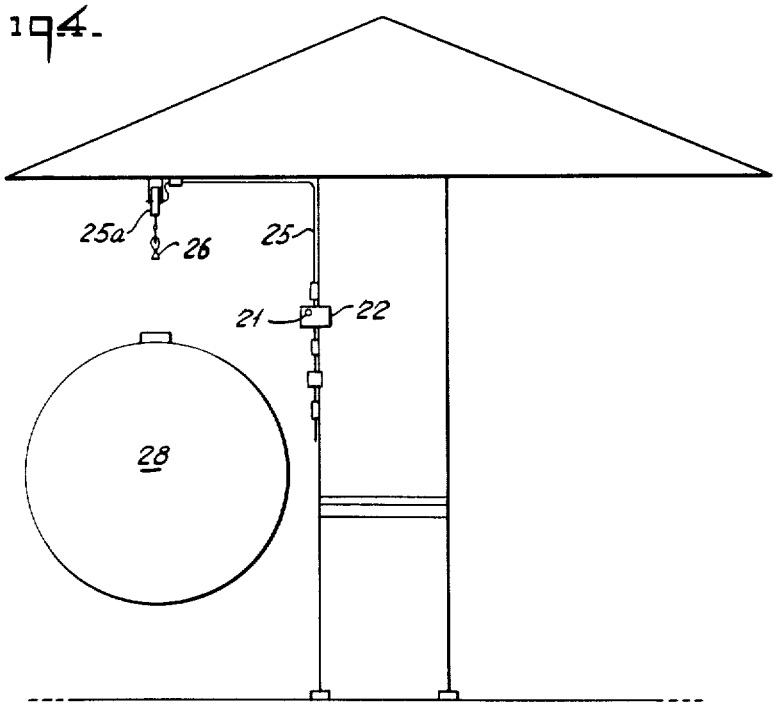
FIG. 4 is a diagrammatic disclosure of the installation of the electrical ground indicator.

FIG. 4 is a diagrammatic showing of the installation of my improved electrical ground indicator at a loading rack. The ground indicator in its explosion proof container is at 22, the double conductors at 25, with the take up reel at 25a, and the spring clamp at 26 for engagement with a tank truck.

Thus there has been shown and described a device for obtaining a reliable static ground on a tank truck or other device which contains volatile products and is capable of building up an electrical charge, with an indication that an electrical ground connection has been made before tank filling operations are started and while filling operations proceed.

Obviously, many modifications and variations of the invention, as hereinbefore set forth, may be made without departing from the spirit and scope thereof, and therefore only such limitations should be imposed as are indicated in the appended claims.

I claim:

1. An apparatus for use in electrically grounding a charged body comprising, in combination, a source of electrical energy including a step down transformer, a series circuit *through said charged body to ground* joined to the output of said transformer comprising a rectifier, a relay control means connected across the output of said rectifier, and a clamping means for attachment to said charged body and to ground, and means, connected across the input to said transformer, for indicating that said series circuit has been grounded electrically including an electrical circuit having a switch responsive to said relay control means and including electrically operated indicating means.

2. In the apparatus as defined in claim 1, one end of said output of said transformer being connected to ground by means separate from the ground connection for said clamping means.

3. A device of the class described comprising, in combination, a transformer and a source of power connected thereto, relay control means, and means for actuating said relay control means interconnected in series with the output of said transformer *and with ground* and comprising a rectifier and clamping means for attachment to a member to be grounded electrically *for completing an electrical circuit to ground,* said relay control means being connected across the output of said rectifier, and means, joined to the input to said transformer for indicating the electrical grounding of said member when said clamping means have been attached.

4. In the device as defined in claim 3, said rectifier being in series with said [source of power] *output of said transformer.*

5. In the device as defined in claim 3, said rectifier being connected across said [source of power] *output of said transformer.*

6. A device for use in electrically grounding a member subject to the build-up of an electrical charge thereon comprising a source of power, a step down transformer joined thereto, [a rectifier] *means* interconnecting the secondary winding of said transformer and said member *including a rectifier,* means joining [the output of] said [rectifier] *member* with ground [and adapted to be attached to said member], relay control means [connected across] *actuated by* [the output of] said rectifier *upon completion of an electrical circuit through said member to ground,* and means comprising an electrical circuit for indicating the grounding of said member connected to said source of power and being [actuated by] *responsive to* said relay control means and including electrically operated indicating means.

7. In the device as defined in claim 6, said rectifier being connected to one of the terminals of said secondary winding, the other terminal of said secondary winding being connected to ground.

8. In the device as defined in claim 6, said rectifier being connected across the output of said transformer.

9. An apparatus to discharge and prevent the accumulation of an electric charge on a body and to indicate its electrically grounded condition comprising, in combination, a source of power including a step down transformer, means for providing alternating current energy thereto, means for electrically grounding a body comprising a series circuit of an impedance, a rectifier and clamping means interconnecting one terminal of the secondary winding of said transformer with ground *through said body,* the other terminal of said secondary winding being joined to ground by means separate from that of said series circuit, and a relay control means connected across the rectifier output, and means comprising an electrical circuit for indicating the electrically grounded condition of said series circuit connected across said source of power and being responsive to said relay control means upon completion of [the] *said* series circuit to ground *through said body* and including electrically operated indicating means.

*10. An apparatus for use in electrically grounding a charged member comprising, in combination, a source of electrical energy; a first series circuit connected across said source of electrical energy and also connected to ground continually, said first series circuit comprising a relay control means and a device having plural contact means electrically isolated from each other for electrically contacting a charged member at separate spaced apart locations thereon, said device being attached to and detached from said charged member at will, said device having one of said contact means connected to said source of electrical energy and having another of said contact means connected to ground for completing said series circuit into, through and out of said member to ground for electrical discharge of said member; a second series circuit connected acrosss said source of electrical energy; and signal means in said second series circuit actuated by said relay control means when said first series circuit is*

*completed through said charged member to ground for indicating an electrically grounded condition of said charged member.*

*11. An apparatus in accordance with claim 10 wherein said source of electrical energy includes a stepdown transformer, one side of the secondary winding of said transformer being connected to ground continually, said series circuit being connected to the other side of said secondary winding and to a ground separate from said ground of said one side of said secondary winding of said transformer.*

References Cited by the Examiner

The following references, cited by the Examiner, are of record in the patented file of this patent or the original patent.

UNITED STATES PATENTS

| | | | |
|---|---|---|---|
| 2,164,076 | 6/1939 | Osgood | 317—2 |
| 2,611,862 | 9/1952 | Riddle | 317—2 |
| 2,647,223 | 7/1953 | Check | 317—2 |
| 2,660,717 | 11/1953 | Hood | 317—2 |
| 2,767,659 | 10/1956 | Greenblatt | 317—2 |

OTHER REFERENCES

Publication: German application 1,029,078, published April 30, 1958.

SAMUEL BERNSTEIN, *Primary Examiner.*

D. YUSKO, *Assistant Examiner.*